United States Patent [19]
Hotta et al.

[11] Patent Number: 4,822,684
[45] Date of Patent: Apr. 18, 1989

[54] SANDWICH GLASS

[75] Inventors: Masahiro Hotta, Kashiwa; Tadasu Inoue, Matsudo, both of Japan

[73] Assignee: Dainippon Plastics Co., Ltd., Osaka, Japan

[21] Appl. No.: 114,995

[22] Filed: Oct. 30, 1987

[30] Foreign Application Priority Data

Mar. 31, 1987 [JP] Japan .................................. 62-80756

[51] Int. Cl.$^4$ .......................... B32B 17/10; B32B 27/32
[52] U.S. Cl. ...................................... 428/426; 428/441
[58] Field of Search ............... 428/441, 426, 430, 435, 428/436, 437, 442

[56] References Cited

U.S. PATENT DOCUMENTS

| | | | |
|---|---|---|---|
| 3,824,148 | 7/1974 | Lopalin | 428/441 X |
| 4,264,658 | 4/1981 | Tobias et al. | 428/441 X |
| 4,309,484 | 1/1982 | Ohmae et al. | 428/441 |

FOREIGN PATENT DOCUMENTS

| | | | |
|---|---|---|---|
| 0785327 | 12/1980 | U.S.S.R. | 428/441 |
| 389115 | 3/1933 | United Kingdom | 428/441 |
| 8605445 | 9/1986 | World Int. Prop. O. | 428/441 |

*Primary Examiner*—Nancy A. B. Swisher
*Attorney, Agent, or Firm*—Armstrong, Nikaido Marmelstein & Kubovcik

[57] ABSTRACT

A sandwich glass comprising a glass plate with one or more glass plates or hard plastic sheets which are laminated and united through a resin interlayer in which the resin interlayer comprises a block copolymer (a) comprising both terminal blocks comprising a polymer of an aromatic vinyl compound and an intermediate block comprising a polymer of conjugated diene series, said both terminal blocks constituting 10–40% by weight of the copolymer and being hydrogenated in a ratio of 10% or less and said intermediate block being hydrogenated in a ratio of 90% or more, which is useful as window glasses, lightening materials, sheltering materials etc.

14 Claims, No Drawings

SANDWICH GLASS

BACKGROUND OF THE INVENTION

1. Field of the Invention

The present invention relates to sandwich glass. More particularly, it relates to a sandwich glass comprising a glass plate with one or more glass plates or hard plastic sheets which are united through a soft interlayer, which is useful as window glasses, lightening materials, sheltering materials, etc. in various fields, especially, as front glass of cars, window glass of vehicles such as aeroplanes, electric cars, etc. or window glass of skyscrapers.

2. Description of the Prior Art

Recently, it is recommended to use sandwich glass as front glass of cars, in view of safety, instead of partially tempered glass hithertofore used, and sandwich glass is nowadays employed for not only quality cars but also public cars. Such sandwich glass is called as safety glass, which consists of usually two or more glass plates laminated and united through soft resin as interlayers. Accordingly, in the case of such sandwich glass, even if the glass plate is damaged by affection of external force, the impact is absorbed by the interlayer and hence the majority of broken glass pieces do not scatter.

As the resin interlayer for the sandwich glass, plasticized butyral resins are mainly used at present, although synthetic resins of cellulose nitrate series or cellulose acetate series have been used hithertofore. The sandwich glass is usually produced by heating the resin interlayer held between glass plates under increased pressure or by heating it at high temperature under reduced pressure while removing air-bubbles.

The plasticized butyral resins mentioned above exhibit excellent properties as interlayer, but show the the drawbacks of a high specific gravity and a fairly lowered impact-absorbing ability, because they become remarkably hard and brittle at low temperatures, especially, below $-20°$ C. Therefore, sandwich glass using such plasticized butyral resins as interlayer includes problems in its weight and its effectiveness as used in cold district.

SUMMARY OF THE INVENTION

Thus, according to the present invention, a sandwich glass comprising a glass plate with one or more glass plates or hard plastic sheets which are laminated and united through a resin interlayer in which the resin interlayer comprises a block copolymer (a) comprising both terminal blocks comprising a polymer of an aromatic vinyl compound and an intermediate block comprising a polymer of conjugated diene series, said both terminal blocks constituting 10-40% by weight of the copolymer and being hydrogenated in a ratio of 10% or less and said intermediate block being hydrogenated in a ratio of 90% or more.

Preferably, it provides the sandwich glass mentioned as above in which the surface of the glass plate or hard plastic sheet to be faced on the resin interlayer has a transparent adhesive resin layer of an ethylene/acrylic acid or methacrylic acid copolymer or a metal salt thereof, an ethylene/vinyl acetate/glycidyl acrylate or glycidyl methacrylate terpolymer, or a block copolymer (b) comprising the above mentioned copolymer (a) to which 0.3-5% by weight of acrylic or methacrylic acid residue is introduced.

The sandwich glass of the present invention is improved on the impact-absorbing ability as used at low temperature, and on the weight, compared with known ones. Further, it shows the same light transmission factor as the known one and moreover its production, using the interlayer which hardly suffers changes in quality due to heating, temperature, water, etc., is advantageous. In addition, when the transparent adhesive resin layer is used, the sandwich glass shows a more prolonged durability. Therefore, the sandwich glass of the present invention can be employed not only for the same use as the previous one, but also is expected to apply to new use different from that of the previous one.

DETAILED DESCRIPTION OF THE PREFERRED EMBODIMENTS

The sandwich glass of the present invention has at least one glass plate to be usually exposed to the outer atmosphere (i.e., to constitute one surface), to which one or more other glass plates or hard plastic sheets are combined by intermediation of the resin interlayer. Examples of the combinations are glass plate - glass plate, glass plate - plastic sheet, glass plate - plastic sheet - glass plate, and glass plate - glass plate - glass plate.

The glass plate used as the material for the sandwich glass may be one molded into the form desired for the purpose of use, and is not necessarily of flat plate form. Usually, various glass materials such as ordinary flat glass, float flat glass, frosted glass, heat-absorbing glass, etc. may apply. The glass plate may be one consisting of two or more layers, so far as they are united through an interlayer. Further, it is also possible to use as the glass plate a colored one, one having coarse surface, or one tempered as a whole or partially.

On the other hand, the hard plastic sheet may be used to constitute one surface or sandwiched layer of the sandwich glass. Such hard plastic sheet is required to be the same transparency as the resin interlayer (usually, a light transmission percentage of 70% or more) and moreover, to have a surface hardness superior than that of the interlayer (a pencil hardness of about 3H-5H) and a good abrasion resistance. As the hard resin, polymethyl methacrylate, polyethylene terephthalate resin, polycarbonate resin or the like is preferred.

The hard plastic sheet fulfilling these requirements can be formed by a process of adhering a film of a hard resin to the resin interlayer and also the hard plastic layer can be formed by a process of forming an adhesive layer on the surface of the resin interlayer, applying a ultraviolet ray curing resin paint having a good abrasion resistance to the adhesive layer, and curing the paint by ultraviolet ray.

Representative physical values of films having a thickness of 100 $\mu$m of these resins are shown in the following Examples or elsewhere.

The hard plastic sheet may consist of two or more layers of different kinds. It is possible to improve the weather resistance and the abrasion resistance of the hard plastic sheet by applying a ultraviolet ray curing resin layer further on the hard resin film adhered to the interlayer to form a hard plastic sheet having a two-layer constitution. This is an embodiment especially useful, for example, for the case using a film whose weather resistance is insufficient, such as a film of polycarbonate resin or the like. The thickness of the hard plastic sheet is suitably 5-500 $\mu$m, preferably 10-200 $\mu$m.

The block copolymer (a) used in the present invention is obtained by hydrogenation of a straight chain polymer having a polymer chain (terminal block) of an aromatic vinyl compound such as polystyrene, poly-α-methylstyrene, poly-p-methylstyrene, polychlorostyrene or the like, on both terminals of a straight polymer chain (intermediate block) of conjugated diene series such as polybutadiene, polyisoprene, polychloroprene or the like. It is preferred from the points of thermal resistance and whether resistance to use a sufficiently hydrogenated one whose intermediate block is hydrogenated in a ratio of 95% or more. Even by such sufficient hydrogenation, the hydrogenation ratio of aryl groups in both terminal blocks is usually suppressed within 10%. Usually, the intermediate block has an average molecular weight of 5000–125,000 and both terminal blocks have an average molecular weight of 10,000–300,000. The most suitable copolymer (a) is one whose both terminal blocks are polystyrene and whose intermediate block has a constitution of ethylene/butylene copolymer (a hydrogenation product of polybutadiene) or one whose both terminal blocks are polystyrene and whose intermediate block has a constitution of ethylene/propylene copolymer (a hydrogenation product of polyisoprene). Such block copolymers (a) are easily available under the names and type numbers KRATON G-1650, KRATON G-1652, KRATON G-1657, KRATON G-1658 (all Shell Chemical's products), TOUGHTECH HR-1041 (Asahi Chemical Industry's product), etc.

By the way, the block copolymers before the hydrogenation turn yellow remarkably in the weather resistance test and accordingly are not suitable for the purpose of the present invention, although they are transparent and soft.

The above-mentioned copolymers (a) may be used individually or, as the case may be, in combination. Since the interlayer is molded into a sheet beforehand, it is usually preferred to select a copolymer (a), or a combination of copolymers (a), having a good sheet-molding property. It is especially preferable to use as the block copolymer (a) a mixture of a block copolymer ① in which both terminal blocks constitute about 10–20% by weight of the same and a block copolymer ② in which both terminal blocks constitute about 25–35% by weight of the same, and it is particularly advantageous for production to mix 20–90 parts by weight of such block copolymer ① with 80–10 parts by weight of such block copolymer ②, whereby the sheet-molding property can be improved significantly.

The resin interlayer of the present invention is preferably composed substantially of the above block copolymer (a) only. However, any other resins may be admixed with it, unless they damage its transparency, softness and weather resistance. Various transparent resin compositions mainly comprising the block copolymer (a) may apply as the interlayer. As such resins, there can be mentioned various resin components such as polypropylene, polypropylene series copolymer, low density polyethylene, high density polyethylene, ethylene/vinyl ester (such as vinyl acetate) copolymer, ethylene/acrylate (such as ethyl acrylate) copolymer, ethylene/acrylic acid (or methacrylic acid) copolymer or its salt, polybutene-1, poly-4-methylpentene-1, and the like. These resin components may be used also in combination. Although there is no special limitation in the ratio of admixing such resin component(s) with the block copolymer (a), it is usually suitable to admix in an amount of 10 parts by weight or less per 100 parts by weight of the block copolymer (a), from the viewpoint of transparency.

The above block copolymer (a) or the resin composition mainly comprising the block copolymer (a) may contain a minor amount (usually, 10 wt % or less of the whole) of low molecular processing aids such as mineral oils, plasticizers, etc. further added thereto. In addition, various additives such as heat-stabilizers, antioxidants, ultraviolet absorbing agents, lubricants, antistatic agents, coloring agents, etc. may also be added in a minor amount, if necessary. When weather resistance is required, it is preferable to incorporate ultraviolet absorbing agents and to incorporate coloring agents over the whole or partially. Addition of ultraviolet absorbing agents and coloring agents is preferred especially when the final product is used for the front glass of cars.

The resin interlayer of the present invention is preferred to use as a sheet, which can be prepared by subjecting the above block copolymer (a) or the resin composition to extrusion molding to mold into sheet (i.e., the so-called sheet-molding) or by flowing its solution into sheet (i.e., casting). Usually, it is suitable to process into sheet by the former method, from the economical point of view.

The sandwich glass of the present invention may be usually obtained by holding such sheet between glass plates having desired form and then pressure adhering them by heating under increased pressure or under reduced pressure, in the same manner as employed hithertofore for the production of sandwich glass. The thickness of the resin interlayer may be properly decided, but is preferable to set it, for example, according to the stipulation (0.38–0.76 mm) of JIS R3211 (safety glass for cars), in the case of sandwich glass to be used for front glass of cars. Further, the adherence of the resin interlayer with the glass plates or hard plastic sheets may be improved by applying a surface coupling treatment (for example, treatment with a silane coupling agent) to the interface of each glass plates or hard plastic sheets to be united, by applying a pretreatment (for example, corona discharge treatment or treatment with a silane coupling agent) to the surface of the interlayer sheet, or by interposing a soft, transparent adhesive resin at the interface between the intermediate layer and glass plates, if it is necessary.

It is preferred from the view-point of practical use to apply an adhesive resin to both surfaces of the interlayer. For such adhesive resin, it is required that the resin does not retard the character of sandwich glass and has a good adhesiveness to glass plates or hard plastic sheets and the block copolymer (a). It has been found from such point of view that an adhesive resin selected from the group consisting of (i) an ethylene/acrylic acid or methacrylic acid copolymer or a metal salt thereof, (ii) an ethylene/vinyl acetate/glycidyl acrylate (or methacrylate) terpolymer and (iii) a block copolymer (b) comprising said block copolymer (a) to which 0.3–5% by weight of acrylic or methacrylic acid residue is introduced, is suitable.

The content of acrylic acid or methacrylic acid in the ethylene/acrylic acid (or methacrylic acid) copolymer is usually 5–20 wt %. Such ethylene/acrylic acid (or methacrylic acid) copolymer is commercially available under the name NUCREL (Mitsui Du Pont Polychemical's product, JAPAN) or others. A metal salt of such ethylene/acrylic acid (or methacrylic acid) copolymer is also available commercially under the name HAIMIRAN (Mitsui Du Pont Polychemical's product, JAPAN) or others, usually with an acid content of 5-20 wt %. The metal salt usually employed is sodium salt or zinc salt. The ethylene/vinyl acetate/glycidyl acrylate (or methacrylate) terpolymer is commercially available under the name BONDFAST (Sumitomo Chemical's product, JAPAN). These adhesive agent (i) and (ii) are each an adhesive agent of hot-melting type. On using them it is desirable to laminate their films and the block copolymer (a) by an extrusion lamination method or to prepare a laminated sheet directly by co-extrusion. Suitable thickness of the adhesive layer is 10-60 μm, preferably 15-30 μm.

On the other hand, the block copolymer (b) comprising the block copolymer (a) to which 0.3-5% by weight of acrylic or methacrylic acid residue is introduced is commercially available under the name TOUGHT-ECH HR-3201 (Asahi Chemical Industry's product, JAPAN). Although the block copolymer (b) can be laminated with the block copolymer (a) by extrusion lamination or co-lamination, like as the above (i) and (ii), it is also possible to laminate the block copolymer (b), which is solvent soluble, by dissolving it in a suitable solvent and applying the solution to the surface of the block copolymer (a). Thickness of application in the latter case is 3-30 μm, preferably 5-15 μm. As the solvent, benzene, toluene, tetrahydrofuran, cyclohexanone, etc. or a mixture thereof is used suitably. In these adhesive resins, various additives such as thermostabilizers, antioxidants, ultraviolet absorbing agents, lubricants, antistatic agents, coloring agents, etc. may be added in minor amount, if necessary. Especially, when weather resistance is required, addition of ultraviolet absorbing agents is preferred.

The sandwich glass of the present invention using the adhesive resin may be produced in the same process as described above, by holding the resin interlayer laminated with the adhesive resin layer between e.g., glass plates and heating them under increased pressure or under reduced pressure.

The block copolymer (a), or the resin composition mainly comprising the block copolymer (a), of the present invention fulfills the necessary conditions such as transparency, softness, weather resistance, etc., which are required for the interlayer of sandwich glass, and at the same time has a superior impact absorbing property, especially under low temperatures, than that of plasticized butyral resins hitherto used. Therefore, problems arising on use under low temperature circumstances are solved. Moreover, the block copolymer (a) has a low specific gravity, and accordingly the sandwich glass obtained is lighter than previously known one.

In the following, the present invention is further explained by giving Examples. The invention, however, shall not be limited to those Examples.

EXAMPLE 1

A composition of the following constituents was blended by a blender and then extruded by an extruder to prepare pellets.

KRATON G-1657: 80 part by weight
KRATON G-1652: 20 parts by weight
Tinuvin P (Ciba-Geigy's product): 0.4 part by weight
(By the way, KRATON G-1657 is a copolymer whose both terminal blocks are polystyrene and whose intermediate hydrogenated block is an ethylene/butylene copolymer, the ratio by weight of the former to the latter being 14/86, and KRATON G-1652 is the same copolymer in which the ratio by weight of the former to the latter is 28/72. Tinuvin P is a ultraviolet absorbing agent comprising 2-(2'-hydroxy-5'-methylphenyl)benzotriazole.)

From the pellets, a sheet having a thickness of 0.8 mm was prepared by extrusion with T-die. The sheet was held between ordinary flat glasses each having a thickness of 2.75 mm, a width of 50 mm and a length of 50 mm and presses under reduced pressure at 230° C. to prepare the sandwich glass of the present invention.

On the other hand, a sandwich glass for comparison was prepared in the same manner as described above, except that a hitherto known plasticized butyral resin (thickness : 0.8 mm) was used as the interlayer and the pressure adhering was effected at 200° C.

With each sandwich glass thus obtained, determination of light transmission percentage and breakdown test under various temperatures by Du Pont's impact tester were effected. The breakdown test was carried out in the following manner.

Setting temperatures at −20° C., 20° C. and 60° C., drop tests were effected by means of Du Pont's impact tester (load : 300 g, dropping from a height of 20 cm) and the state of breakdown was observed.

The results are shown in Table 1.

TABLE 1

|  |  |  | Example 1 | Comparative Example |
|---|---|---|---|---|
| Light transmission percentage (450 nm, %) |  |  | 87 | 88 |
| Break-down test | −20° C. | A | Partial cracking | Big cracking |
|  |  | B | Slight scattering | Many scattering |
|  | 20° C. | A | Big cracking | Big cracking |
|  |  | B | Slight scattering | Slight scattering |
|  | 60° C. | A | Big cracking | Big cracking |
|  |  | B | Scattering | Slight scattering |

Note: In the table, A denotes the state of breakdown of glass and B denotes the state of scattering of broken glass pieces (in common with the following tables).

EXAMPLE 2

With a composition of the following constituents, a sandwich glass of the present invention was prepared in the same manner as Example 1.

KRATON G-1657: 90 parts by weight
KRATON G-1652: 10 parts by weight
A polypropylene random copolymer: 5 parts by weight
Tinuvin P : 0.4 part by weight With the sandwich glass obtained, determination of light transmission percentage and breakdown test were effected in the same manner as Example 1. The results are shown in Table 2.

TABLE 2

|  |  |  | Example 2 |
|---|---|---|---|
| Light transmission percentage (450 nm, %) |  |  | 85 |
| Breakdown test | −20° C. | A | Partial cracking |
|  |  | B | Slight scattering |
|  | 20° C. | A | Cracking |
|  |  | B | Few scattering |
|  | 60° C. | A | Cracking |
|  |  | B | Scattering |

EXAMPLE 3

With a composition of the following constituents, a sandwich glass of the present invention was prepared in the same manner as Example 1.

KRATON G-1657: 90 parts by weight

KRATON G-1650: 10 parts by weight
Tinuvin P: 0.4 part by weight
(KRATON G-1650 has the same constitution as KRATON G-1652, but of a higher molecular weight.)

The results of tests effected with the sandwich glass obtained are shown in Table 3.

TABLE 3

|  |  |  | Example 3 |
|---|---|---|---|
| Light transmission percentage (450 nm, %) |  |  | 88 |
| Breakdown test | −20° C. | A | Partial cracking |
|  |  | B | Slight scattering |
|  | 20° C. | A | Partial cracking |
|  |  | B | Few scattering |
|  | 60° C. | A | Big scattering |
|  |  | B | Scattering |

EXAMPLE 4

With a composition of the following constituents, a sandwich glass was prepared and tested in the same manner as Example 1.
KRATON G-1657: 70 parts by weight
KRATON G-1652: 30 parts by weight
Paraffin oil: 7 parts by weight
Tinuvin P: 0.2 part by weight
Sanol LS-622 LD: 0.2 part by weight
Sanol LS-622 LD is a light stabilizer of hindered amine series (Ciba-Geigy's product).
The results are shown in Table 4.

TABLE 4

|  |  |  | Example 4 |
|---|---|---|---|
| Light transmission percentage (450 nm, %) |  |  | 88 |
| Breakdown test | −20° C. | A | Partial cracking |
|  |  | B | Slight scattering |
|  | 20° C. | A | Partial cracking |
|  |  | B | Slight scattering |
|  | 60° C. | A | Partial cracking |
|  |  | B | Slight scattering |

As exhibited by the above Examples 1-4, the sandwich glass of the present invention is superior to the hitherto known one in respect of breakdown resistance at a low temperature of −20° C., although any difference can scarcely be recognized between the two in respect of breakdown resistance at room temperature or a higher temperature.

EXAMPLE 5

With a composition of the following constituents, a sheet having a thickness of 0.7 mm was prepared in the same manner as Example 1. Both surfaces of the sheet were corona discharge, to improve the adhesiveness with glass. By this treatment, the wetting index 31 of the untreated sheet was raised up to 52, exhibiting surface polarization effect.
KRATON G-1657: 70 parts by weight
TOUCHTECH HR-1041: 30 parts by weight
Tinuvin 326: 0.2 part by weight
Tinuvin 622 LD: 0.2 part by weight
With this sheet, a sandwich glass was prepared in the same manner as Example 1 and its properties were determined. The results are shown in Table 5.

TABLE 5

|  |  |  | Example 5 |
|---|---|---|---|
| Light transmission percentage (450 nm, %) |  |  | 89 |
| Heat-resistance |  |  | No abnormal signs |
| Breakdown | −20° C. | A | Partial cracking |

TABLE 5-continued

|  |  |  | Example 5 |
|---|---|---|---|
| test |  | B | Few scattering |
|  | 20° C. | A | Partial cracking |
|  |  | B | Few scattering |
|  | 60° C. | A | Partial cracking |
|  |  | B | Slight scattering |

The heat-resistance given in the Table 5 is the results obtained by checking on a change in the state of the sandwich glass as dipped and heated in boiling water by a test according to JIS R3212-1979.

EXAMPLE 6

With a composition of the following constituents, a sheet (intermediate layer) having a thickness of 0.8 mm was prepared in the same manner as Example 1.
KRATON G-1657: 90 parts by weight
KRATON G-1652: 10 parts by weight
Tinuvin P: 0.4 part by weight
The results obtained by determination of various physical properties of the sheet are shown in Table 6, along with a comparative example (a commercially available plasticized butyral resin sheet for sandwich glass : 0.8 mm).

TABLE 6

|  | Example | Comparative Example |
|---|---|---|
| Specific gravity | 0.90 | 1.26 |
| Tensile strength (Kg/cm$^2$) | 185 | 110 |
| Tensile elongation (%) | 830 | 290 |
| Weight loss on heating (%) (100° C. × 6 hours) | 0.07 | 11.5 |
| Water absorption (%) (50° C. × 24 hours:in water) | 0.03 | 1.05 |
| Water extractant (%) (50° C. × 24 hours:in water) | 0.06 | 2.51 |
| Light transmission percentage (%) (450 nm) | 98 | 98 |
| Weather resistance (Light transmission percentage after irradiation for 1000 hours by weathermeter) | No change (98) | Almost no change (97) |
| Dynamic modulus  −20° C. | $1.4 \times 10^2$ | $6.7 \times 10^3$ |
| (Kg/cm$^2$)         20° C. | $5.6 \times 10^1$ | $1.3 \times 10^3$ |
|                              50° C. | $3.1 \times 10^1$ | $1.3 \times 10^1$ |

As it is evident from this table, the interlayer of the present invention has a low specific gravity and has many merits in various properties such as weight loss on heating, water absorption, water extractant, dynamic modulus at low temperatures, etc., compared with hitherto known intermediate film (plasticized butyral resin). Moreover, it is by no means inferior to the hitherto known one in light transmission percentage, and is superior to the known one also in weather resistance. The low specific gravity is a big merit for reducing the weight of sandwich glass, and the low dynamic modulus at low temperatures is convenient for impact absorption at low temperatures.

EXAMPLE 7

A composition of the following constituents was blended by a blender and then extruded by an extruder to prepare pellets.
KRATON G-1657: 70 parts by weight
KRATON G-1652: 30 parts by weight
Tinuvin P (Ciba-Geigy's product): 0.4 part by weight
With the pellets, a sheet having a thickness of 0.8 mm was prepared by extrusion with T-die. A 10% solution of TOUGHTECH HR-3201 (Asahi Chemical Industry's product), the block copolymer (b) in toluene was applied to the sheet and dried to form an adhesive resin layer having a thickness of about 5 μm on the surfaces of said sheet. The sheet was then held between ordinary flat glasses each having a thickness of 2.75 mm, a width of 50 mm and a length of 50 mm, and pressed under reduced pressure at 220° C. to prepare a sandwich glass of the present invention.

On the other hand, for the comparison's sake, another sandwich glass was prepared using hitherto known plasticized butyral resin (having a thickness of 0.8 mm) in the same manner as described above, except that the pressure adhering was effected at 200° C. Further a sandwich glass was prepared by using non-coated sheet obtained by the above pellets.

With the sandwich glasses obtained, light transmission percentage (450 nm,%) and peeling strength at 180° were determined, and heat resistance test according to JIS R3212-1979 and breakdown test at various temperatures by means of Du Pont's impact tester were effected. In the breakdown test, the state of breakdown as a dropping plumb having a load of 300 g was dropped from the height of 20 cm was observed. The peeling test at 180° was carried out with samples of two-layer laminates each prepared from flat glass and the corresponding resin sheet. The results are shown in the following table:

EXAMPLES 8–10 and COMPARATIVE EXAMPLE 1

A composition of the following constituents was blended by a blender and then extruded by an extruder to prepare pellets. This composition was named composition-A.
KRATON G-1657: 50 parts by weight
KRATON G-1652: 50 parts by weight
Tinuvin P: 0.4 part by weight Using the pellets and each of the resins described below, a co-extrusion sheet composed of an intermediate composition-A layer having a thickness of 700 μm and an adhesive resin layer having a thickness of 25 μm on both sides of the intermediate layer, was prepared by using a stack plate die.

Adhesive resins used:
Example 8 : NUCREL N 1207 C
  (an ethylene/acrylic acid copolymer; Mitsui Du Pont Polychemical's product)
Example 9 : HAIMIRAN 1652
  (zinc salt of an ethylene/acrylic acid copolymer; Mitsu Du Pont Polychemical's product)
Example 10 : BONDFAST A
  (an ethylene/vinyl acetate/glycidyl acrylate terpolymer; Sumitomo Chemical's product)
Comparative Example 1 : EEA DPDJ-6182
  (an ethylene/ethyl acrylate copolymer; Nihon Unicar's product; JAPAN)

|  |  |  | (1) Sandwich glass using a sheet coated with HR-3201 | (2) Sandwich glass using a sheet of plasticized butyral | (3) Sandwich glass using non-coated sheet |
|---|---|---|---|---|---|
| Light transmission percentage (%) | | | 86 | 88 | 87 |
| Peeling strength, 180° (Kg/60 mm) | | | 4.2 | 4.8 | 2.0 |
| Heat resistance | | | No abnormal signs | No abnormal signs | Some Babbles generate between the glasses and the intermediate layer |
| Breakdown test | −20° C. | A | Partial cracking | Big cracking | Partial cracking |
| | | B | Almost no scattering | Many scattering | Slight scattering |
| | 20° C. | A | Slight cracking | Big cracking | Big cracking |
| | | B | Slight scattering | Slight scattering | Slight scattering |
| | 60° C. | A | Slight cracking | Big cracking | Big cracking |
| | | B | Slight scattering | Scattering | Scattering |

Note:
A denotes the state of breakdown of glass, and
B denotes the state of scattering of broken glass pieces.

As evident from the above table, the sandwich glass using the sheet coated with HR-3201 (a block copolymer (b)) as the interlayer shows satisfactory properties in all respects. Above all, it has a superior breakdown resistance at low temperatures, together with nearly equal adhesiveness to the hitherto known sandwich glass.

With these sheets, sandwich glasses were prepared in the same manner as Example 7 and their properties were determined. The results are shown in the following table:

|  | Thickness of adhesive layer (μm) | Light transmission percentage (%) | 180° Peeling strength (Kg/50 mm) | Heat resistance | Breakdown test −20° C. A | B | 20° C. A | B |
|---|---|---|---|---|---|---|---|---|
| Example 8 | 20–30 | 85 | 6.2 | No abnormal signs | Partial cracking | Few scattering | Slight cracking | Slight scattering |
| Example 9 | 22–32 | 86 | 6.8 | No abnormal signs | Partial cracking | Few scattering | Slight cracking | Slight scattering |
| Example 10 | 20–28 | 85 | 6.5 | No abnormal signs | Partial cracking | Few scattering | Slight cracking | Slight scattering |
| Comparative Example 1 | 23–28 | 86 | 2.8 | Some Babbles generated | Partial cracking | Scattering | Slight cracking | Scattering |

Example 8-10 gave satisfactory results.

EXAMPLE 11

Using the composition-A of Example 8, a sheet having a thickness of 650 μm was prepared by extrusion through T-die. Then, a three-layer sheet was prepared from the sheet according to lamination method by extruding it together with two films of Bondfact A each having a thickness of 20 μm. With the three-layer sheet, sandwich glass was prepared in the same manner as Example 7 and properties were determined. The following results were obtained:
Light transmission percentage: 86%
180°-peeling strength (Kg/50 mm): 6.1
Heat-resistance: No abnormal signs
Breakdown test
 −20° C.
  A: Partial cracking
  B: Few scattering
 20° C.
  A: Partial cracking
  B: Few scattering

EXAMPLE 12

Using the composition-A of Example 8, a sheet having a thickness of 700 μm was prepared by means of T-die. On both surface of the sheet, a thin layer of TOUGHTECH HR-3201 was formed in the manner described in Example 7. The resulting sheet was held between a flat glass of Example 7 and a polycarbonate film (hard plastic sheet) having a thickness of 30 μm, and then pressed at 210° C. to prepare sandwich glass of the present invention. The results obtained by determining the properties of the sandwich glass were as follows:
Light transmission percentage: 86.7%
180°-peeling strength (Kg/50 mm)
 Flat glass side: 4.0
 Polycarbonate side: 3.6
Heat-resistance: No abnormal signs
Breakdown test
 −20° C.
  A: Cracking
  B: Few scattering
 20° C.
  A: Slight cracking
  B: Few scattering
 60° C.
  A: Slight cracking
  B: Few scattering Thin sandwich glass was superior to one comprising flat glass on both sides, in respect of safety, because there were no abnormal signs on its polycarbonate side, even when the glass side was cracked.

EXAMPLE 13

A composition of the following constituents was blended by a blender, and then extruded by an extruder to prepare pellets.
 KRATON G-1657: 60 parts by weight
 TOUGHTECH HR-1041: 40 parts by weight
 Tinuvin 326: 0.20 part by weight
 Tinuvin 622 LD: 0.20 part by weight With this composition, a sheet having a thickness of 700 μm was prepared by extrusion method using T-die. In the same manner as Example 7, TOUGHTECH HR-3201 layer was formed on both surfaces of the sheet and flat glass was laminated on one side.

Next, a ultraviolet ray curing resin composition having the constitution given in the following table was applied to the sheet up to a thickness of about 20 μm and dried at 80° C. for 10 minutes.

|  | Composition (Polyurethane acrylate) | Compounding ratio (% by weight) |
| --- | --- | --- |
| Oligomer | A reaction product of 2,4-tolylene diisocyanate, 2-hydroxyethyl acrylate and trimethylolpropane | 40 |
| Reactive monomer | 1,6-Hexanediol diacrylate | 10 |
|  | Tetrahydrofurfuryl acrylate | 10 |
| Others (solvent) | Ethyl cellosolve | 10 |
|  | Isopropyl alcohol | 10 |
|  | Toluene | 10 |
|  | Ethyl acetate | 10 |

Then, ultraviolet ray was irradiated four times at a ultraviolet ray strength of 350 mW/cm$^2$ and an irradiation speed of 20 m/minute to complete curing of the surface composition. The pencil strength of the resulting hard plastic layer (sheet) was 4H, and the thickness of the cured film was about 10 μm.

Properties of this sandwich glass were as follows:
Light transmission percentage: 86%
180°-peeling strength (Kg/50 mm): 4.2
Heat-resistance: No abnormal signs
Breakdown test
 −20° C.
  A: Cracking
  B: Almost no scattering
 20° C.
  A: Slight cracking
  B: Few scattering

EXAMPLE 14

Using the composition-A of Example 8, a sheet having a thickness of 650 μm was prepared by extrusion. On both surfaces of the sheet, a film having a thickness of 5 μm of TOUGHTECH HR-3201 was formed in the same manner as Example 7. The results obtained by determining various properties of the resulting sheet are shown in the following table, along with the results obtained with a commercially available plasticized butyral resin sheet (thickness : 750 m) for sandwich glass.

|  |  | Example 14 | Comparative Example |
| --- | --- | --- | --- |
| Specific gravity |  | 0.90 | 1.26 |
| Tensile strength (Kg/cm$^2$) |  | 190 | 110 |
| Tensile elongation (%) |  | 810 | 290 |
| Weight loss on heating (%) (100° C. × 6 hours) |  | 0.05 | 11.5 |
| Water absorption (%) (50° C. × 24 hours:in water) |  | 0.05 | 1.05 |
| Water extractant (%) (50° C. × 24 hours:in water) |  | 0.04 | 2.51 |
| Light transmission percentage (%) (450 nm) |  | 98 | 98 |
| Weather resistance (Light transmission percentage after irradiation for 1000 hours by weathermeter) |  | No change (98) | Almost no change (97) |
| Dynamic moduls (Kg/cm$^2$) | −20° C. | 1.6 × 10$^2$ | 6.7 × 10$^3$ |
|  | 20° C. | 6.5 × 10$^1$ | 1.3 × 10$^3$ |
|  | 50° C. | 4.5 × 10$^1$ | 1.3 × 10$^1$ |

What we claimed is:

1. A sandwich glass comprising a glass plate with one or more glass plates or hard plastic sheets which are laminated and united through a resin interlayer in which the resin interlayer comprises a block copolymer (a) comprising both terminal blocks comprising a polymer of an aromatic vinyl compound and an intermediate block comprising a polymer of conjugated diene series, said both terminal blocks constituting 10–40% by weight of the copolymer and being hydrogenated in a ratio of 10% or less and said intermediate block being hydrogenated in a ratio of 90% or more.

2. The sandwich glass of claim 1 in which the surface of the glass plate or hard plastic sheet to be faced on the resin interlayer has a transparent adhesive resin layer of (i) an ethylene/acrylic acid or methacrylic acid copolymer or a metal salt thereof, (ii) an ethylene/vinyl acetate/glycidyl acrylate (or glycidyl methacrylate) terpolymer or (iii) a block copolymer (b) comprising said block copolymer (a) to which 0.3–5% by weight of acrylic or methacrylic acid residue is introduced.

3. The sandwich glass of claim 1 in which the resin interlayer is a transparent resin composition containing the block copolymer (a) as the main component and another resins.

4. The sandwich glass of claim 1 in which the polymer of aromatic vinyl compound is polystyrene, poly-α-methylstyrene, poly-p-methylstyrene or polychlorostyrene.

5. The sandwich glass of claim 1 in which the polymer of conjugated diene series is polybutadiene, polyisoprene or polychloroprene.

6. The sandwich glass of claim 1 in which both of the terminal blocks are composed of polystyrene.

7. The sandwich glass of claim 1 in which the intermediate block is composed of ethylene/propylene copolymer or ethylene/butylene copolymer.

8. The sandwich glass of claim 1 in which both of the terminal blocks have an average molecular weight of 10,000–300,000.

9. The sandwich glass of claim 1 in which the intermediate block has an average molecular weight of 5000–125,000.

10. The sandwich glass of claim 1 in which the glass plate is ordinary flat glass, float flat glass, frosted glass or heat-absorbing glass.

11. The sandwich glass of claim 1 in which the hard plastic sheet comprises polymethylmethacrylate, polyethylene terephthalate resin or polycarbonate resin.

12. The sandwich glass of claim 1 in which the hard plastic sheet comprises an ultraviolet ray curing resin.

13. The sandwich glass of claim 1 in which two glass plates are laminated and united through the interlayer.

14. The sandwich glass of claim 1 in which a glass plate and a hard plastic sheet are laminated and united through the interlayer.

* * * * *